US007109694B2

(12) United States Patent
Mihalka

(10) Patent No.: US 7,109,694 B2
(45) Date of Patent: Sep. 19, 2006

(54) DIGITAL MULTIPHASE CONTROL SYSTEM

(75) Inventor: Alex Mihalka, Livermore, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/890,674

(22) Filed: Jul. 14, 2004

(65) Prior Publication Data
US 2005/0012492 A1 Jan. 20, 2005

Related U.S. Application Data

(60) Provisional application No. 60/487,294, filed on Jul. 14, 2003.

(51) Int. Cl.
G05F 1/46 (2006.01)
(52) U.S. Cl. .................................... 323/283
(58) Field of Classification Search ................ 323/222, 323/224, 225, 282, 283, 350
See application file for complete search history.

(56) References Cited

U.S. PATENT DOCUMENTS 6,271,650 B1 * 8/2001 Massie et al. ............... 323/272
6,362,607 B1 * 3/2002 Wickersham et al. ....... 323/272
6,563,294 B1 * 5/2003 Duffy et al. ................. 323/283
6,806,689 B1 * 10/2004 Schuellein et al. .......... 323/272
6,826,028 B1 * 11/2004 Schuellein .................. 361/93.1

* cited by examiner

Primary Examiner—Gary L Laxton
(74) Attorney, Agent, or Firm—Ostrolenk, Faber, Gerb & Soffen, LLP

(57) ABSTRACT

A multi-phase control system for a power supply provides a data bus between a controller and multiple phase drivers to obtain a synchronous control through a flexible and non-dependent control configuration. The controller provides data signals to the data bus that is connected to the various phase drivers, with the data signals dependent upon a switching frequency and ON/OFF command signals for a particular phase. Each of the phase drivers have decoding logic for receiving the data signals over the data bus, as well as independent selection or addressing logic for choosing the phase driver to react to the data signals on the data bus. A variety of control configurations may be realized according to this control technique including resetting all drivers, setting all phases to ON or all phases to OFF conditions, skipping phase activation and so forth. The flexible control permits output current sharing to be controlled among the various phases to provide a desired output current for the power supply. The control configuration permits fast and robust response to transient conditions while providing a simplified control in an N phase system over a data bus that can vary between 1 and M lines.

11 Claims, 4 Drawing Sheets

DMCS
System Block Diagram

Fig. 1 DMCS
System Block Diagram

| D2 | D1 | D0 | COMMAND |
|---|---|---|---|
| 0 | 0 | 0 | NO CHANGE |
| 0 | 0 | 1 | ON |
| 0 | 1 | 0 | OFF |
| 0 | 1 | 1 | ON/OFF |
| 1 | 0 | 0 | ALL OFF |
| 1 | 0 | 1 | RESET ON CTR |
| 1 | 1 | 0 | RESET OFF CTR |
| 1 | 1 | 1 | ALL ON |
| 0 | 0 | 1W | SKIP NEXT ON |
| 0 | 1W | 0 | SKIP NEXT OFF |

*1W = wide pulse

3-WIRE TRUTH TABLE

**4 PHASE SYSTEM
NO OVERLAP**

**4 PHASE SYSTEM
WITH 3 PHASE OVERLAP**

**4 PHASE SYSTEM
SIMULTANEOUS ON/OFF**

**4 PHASE SYSTEM
ALL ON**

**4 PHASE SYSTEM
ALL OFF**

**4 PHASE SYSTEM
SKIP PH2**

DIGITAL MULTIPHASE CONTROL SYSTEM

RELATED APPLICATION

This application claims the benefit of U.S. Provisional Application No. 60/487,294, filed Jul. 14, 2003. This application is related to application Ser. No. 10/392,121 filed Mar. 18, 2003 the subject matter of which is incorporated herein by reference.

FIELD OF THE INVENTION

This invention relates to power supplies and more specifically relates to a novel multi phase topology power supply with a digital implementation.

BACKGROUND OF THE INVENTION

Power supplies for computing and telecom applications continue to be challenged to supply higher current as system voltages drop. Accordingly, power supplies have gone from single phase to multiple phase topologies. To produce a single output voltage in a multi phase design, several power stages, or phases, are paralleled together such that the current from each phase is summed to produce the desired output current. For n stages in parallel, one of the phases will start its period every 360/n electrical degrees. This technique reduces component stress compared to the single phase solution, and enjoys other benefits such as reducing output voltage ripple for a given capacitor configuration.

A system of this type is shown in copending application Ser. No. 10/392,121, filed Mar. 18, 2003 entitled MULTIPHASE BUCK CONVERTER in the names of George Schuellein, Dan Clavette and Mark Crowther and assigned to the assignee of the present invention.

To control a multi phase topology, a main controller having multiple outputs is used to supervise the power switches of the phases. For two or three phases, the drivers for the switches are usually integrated into the controller. However, as the number of phases increases, heat produced by the drivers becomes excessive, indicating the desirability to transition to the use of external drivers. This transition takes heat out of the controller and allows the driver to be close to the switches, which increases efficiency, helps with noise immunity of the gate signal, and decreases switching time.

To control more phases, dedicated controllers designed for the exact number of phases can be made, or two-or three-phase controllers can be cascaded. Alternatively, a controller having a flexible method of communicating to the phase drivers would be desirable which would allow any number of phases to be controlled. It would also be desirable to provide a controller that is unique from any other type of controller and wherein the number of phases is selectable by the user. While such a device could be controlled by conventional analog methods common in converters, control of the phases by means of a digital bus would be very desirable.

SUMMARY OF THE INVENTION

In accordance with the present invention, a controller generates a digital instruction set that communicates to the phases through a bus system that is connected in parallel to all the phase drivers. The bus system is straight forward and can accommodate enough instructions to control the power supply for high performance. Instructions can be added by increasing the number of digital bus lines. However, creating longer pulses or multiple pulses in predetermined patters with corresponding logic to decode the information are other ways of communication, which can be used to increase the instruction set without additional bus lines. Further, with appropriate logic in the phase driver the invention can also be implemented with fewer bus lines. Although a system can be devised with a single bus line, a two-line bus system is preferred as the minimum number of lines necessary to gain practical control of the power converter. In the two line system, one line is used to turn a phase ON and another line is used to turn a phase OFF, which allows for simultaneity of these commands.

An N-line system can be configured to operate in a variety of ways, including with passive elements operating in conjunction with oscillators and PWM drivers. The use of commonly used components for the control configurations can simplify or ease the design of an N-driver system with N phases. In accordance with one embodiment of the present invention, each phase driver of an N-phase system is provided with counters that are automatically cycled through a modulo-N count to obtain digital addresses in each driver. When the output of either of the two counters in the driver matches the unique address of the phase, the input command lines are read to determine the appropriate action, such as turning on or turning off the driver output.

In accordance with this control scenario, a wide variety of flexibility is provided, through the manipulation of the data lines provided to each of the N-phase drivers according to a desired control scheme, and/or manipulation of the counters in each of the phase drivers, for example. The flexibility provided by the design of the present invention also reduces part counts and eliminates a number of components that would be redundant with conventional multi-phase operation. The elimination of redundancies also serves to eliminate drift or offset errors that can occur among the several phases, while signal to noise ratios can be increased. The digital phase control also permits a control scheme to be realized without the use of high precision timing resistors that can add complexity and sensitivity to a typical design. The present invention provides fast response times because it is capable of asynchronous operation, and can turn all phases on or off simultaneously, for example, to recover from a transient condition.

A controller according to the present invention to control the various phase drivers can operate to disengage a phase driver if the driver experiences an overtemperature condition or fails to operate properly.

In one system, a main controller consists of an oscillator and pulse width modulator (PWM) common in analog control ICs. A passive element programs the switching frequency of the oscillator. The oscillator produces a pulse that turns ON the main switch of the converter's power circuit on a regular basis, and the PWM produces a pulse that turns OFF the main switch of a power converter. The timing between selective rising edges of these two pulse sources determines the pulse width applied to a given phase. For instance, in the case where the system is operated with phase overlap, a turn-ON signal on data line D0 applied to one phase is followed by a turn-OFF signal on data line D1 applied to another phase, which ends a pulse started with a previous turn-ON signal. In the case of no phase overlap, a turn-ON signal on data line D0 turns ON a given phase, and the next turn-OFF signal on data line D1 turns OFF the same phase.

In addition to the elements of an analog controller, the controller also contains supporting logic to generate an instruction set over a data bus D with signals D0, D1, and D2. These data lines are connected in parallel with all the phase drivers. The controller is programmed via the N input pins that are either pulled low (tied to common) or left open (pulled high by internal resistance) to indicate the number of phases of the system, to avoid the use of external components.

Each phase driver has address inputs called A inputs to create a unique digital address. These inputs are programmed in a similar low/high manner as the N inputs on the controller and require no external components. Any number of address inputs to the phase drivers can be used. For example, three input pins can control up to 8 drivers, 4 input pins can control up to 16 drivers, etc. Alternatively, the address of the phase can be determined by a single pin and a two-resistor divider in conjunction with comparators in the phase driver.

Internal to each phase driver are two digital counters, an ON counter for turning the phase ON, and an OFF counter for turning the phase OFF. The outputs of these counters are the addresses of the phase that is to be turned on or turned off at the next ON or OFF signal from the data bus D. The address of the phase that is to be controlled next does not appear on the bus; instead, this address is found in the phase counters, and the controller and each phase driver have the same address. This is true for both the ON and OFF counters. If the phase address A matches the output of the phase driver's ON counter, the next instance of the ON signal from the D bus will turn on that phase. A similar situation applies for the OFF signal.

In the case where there is no phase overlap (only one phase need be turned on at any time during steady state operation), the ON and OFF addresses will be the same before the phase turns on. When there is phase overlap, the ON and OFF addresses will be different. In general, the ON and OFF addresses rotate with respect to each other in an infinitely variable manner.

The phase driver also contains steering logic to perform other functions, such as resetting the counters when it is time to return to the first phase, and forcing all phases either ON or OFF during transients.

Finally, current sharing can be accomplished in a number of ways. One way uses a common share bus to the controller. The next phase to be turned OFF will have its ISHARE switch in the phase IC turned on. This signal represents the difference between the average current of the next phase to be turned OFF and the average of all phase currents. The controller IC will appropriately alter the ramp of the PWM to ensure current sharing.

Other features and advantages of the present invention will become apparent from the following description of the invention, which refers to the accompanying drawings.

BRIEF DESCRIPTION OF THE DRAWINGS

FIG. 1 is a block diagram of an embodiment according to the present invention.

FIG. 6 is a timing diagram showing data and phase signals with all phases ON.

DETAILED DESCRIPTION OF THE PREFERRED EMBODIMENTS

Figure 2:
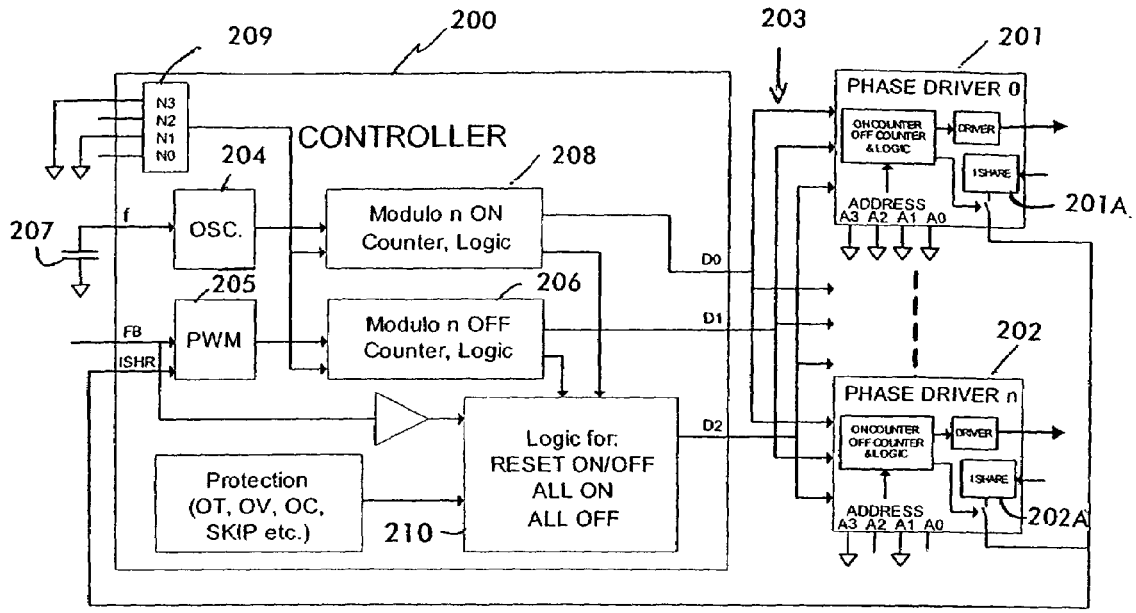
FIG. 2 is a truth table for the embodiment illustrated in FIG. 1.

Referring first to FIG. 1, there is shown a controller 200 and a plurality of individual phase drivers 201, 202, which represent the first and last of n drivers. FIG. 1 illustrates the invention for a 3-wire digital bus configuration 203.

The main controller 200 contains an oscillator 204 and a pulse width modulator 205 as common components to an analog control IC. A suitable passive component fixes the frequency f of the oscillator 204. Oscillator 204 is connected to the ON counter logic 205 and the modulator 208 is connected to the OFF counter logic 206.

Controller 200 generates a digital instruction set that communicates to phase drivers zero through N (201, 202). A bus 203 provides the channel for communication between controller 200 and phase drivers 201, 202. Controller 200 generates a digital instruction set that communicates with phase drivers 201, 202 through a bus system 203 that is connected in parallel to each of the phase drivers. Bus 203 is configured as a three-wire bus and illustrates the present invention in a straightforward application that provides simple instructions to control the power supply with high performance. Controller 200 can be modified to provide a number of instructions that can be accommodated by increasing the number of digital bus lines in bus 203. In general, the data lines can number from 1 to M, where M is an arbitrary value related to transferring desired data. In addition, or alternatively, longer or multiple pulses in predetermined patterns with corresponding logic to decode the information in phase drivers 201, 202 may be supplied by controller 200 as an example of other means for communication between controller 200 and phase drivers 201, 202. The use of longer pulses or multiple pulses is an example of how the instruction set may be increased without the use of additional bus lines in bus 203. In addition, with appropriate logic in phase drivers 201, 202, the present invention can also be implemented with fewer than three bus lines in bus 203. While the system according to the present invention can be operated with a single bus line, preferably a minimum of a two bus wire system is used to gain practical control over the power converter, where one line represents a phase turn on command and another line represents a phase turn off command. The provision of at least two control lines in bus 203 permits the commands to be provided simultaneously on each of the phase drivers 201, 202, for example.

The three wire system illustrated in FIG. 1 can be configured in a number of ways, and the following description illustrates only one preferred embodiment. Controller 200 includes an oscillator 204 and a pulse width modulator (PWM) 205, each of which are typical in analog control ICs. A passive element, such as capacitor 207 programs the switching frequency of oscillator 204 to establish the multiphase switching frequency. Oscillator 204 produces a pulse that turns on the main switch of the power converters power circuit on a regular basis, while PWM 205 produces a pulse that turns off the main switch of the power converter. The timing between selected rising edges of the pulses produced by oscillator 204 and PWM 205 determines the pulse width of the signal provided to phase drivers 201, 202. For instance, in the case where the system is operated with phase overlap, a turn-ON signal from oscillator 204 is propagated on data line D0 to turn a selected phase ON. The next turn-OFF signal from PWM 205 propagated on data line D1 is applied to another phase, which signals the ends of a pulse started with a previous turn-ON signal. In the case of no phase overlap, a turn-ON signal on data line D0 turns ON a given phase, and the next turn-OFF signal on data line D1 turns OFF the same phase.

Controller 200 also contains logic generation components to generate an instruction set over a data bus 203 composed of signals D0, D1 and D2. The data lines in bus 203 are connected parallel with phase drivers 201, 202. Controller 200 is programmed through the N input pins in block 209, with input pins being either pulled low, that is, tied to a common reference potential, or left open, that is, pulled to a higher voltage by internal resistance. By programming the N input pins either low or high in block 209, the number of phases in the system may be indicated without the use of any external components.

Each of phase drivers 201, 202 has an address input represented by address lines A0–A3 that are used to create a unique digital address. The inputs A0–A3 are programmed in a similar low/high manner as the N inputs in block 209. Accordingly, the address inputs do not require any external components, as is the case with programming the N inputs on controller 200. The address inputs A0–A3 can number any variable number of lines, such as three input lines for up to eight phase drivers or four input lines for controlling up to sixteen phase drivers, and so forth. Alternatively, or in addition, the address of each of these phase drivers can be determined by a single pin and a two-resistor divider in conjunction with comparators in the phase driver to discriminate different addresses based on voltage levels.

Each of phase drivers 201, 202 preferably includes two digital counters that function as an ON counter for turning the phases on, and an OFF counter for turning the phases off. The counters are modulo-N counters that cycle through addresses of the phase drivers 201, 202 in conjunction with control from the data bus lines D0–D2 on bus 203. For example, an ON signal may be provided on data line D0, while an OFF signal may be provided on data line D1, each to control the phase driver currently selected to be the next ON or OFF phase. In essence, the outputs of the counters for each phase driver 201, 202 are used to select the appropriate phase driver that is to be turned on or off at the next on or off signal provided by data bus 203. Accordingly, there is no address bus to specifically address each phase driver 201, 202, so that each phase driver 201, 202 operates independently based on the ON/OFF counters and the control signals provided on bus 203. For example, each of phase drivers 201, 202 need not have the same count in each of its two modulo-N counters. The ON/OFF counters in each of phase drivers 201, 202 are synchronized with ON/OFF counters 206, 208 in controller 200 so that all of the ON/OFF counters maintain the same address at any point in time. This is to say that the ON counter address is respectively the same in controller 200 and drivers 201, 202, and the OFF counter address is respectively the same in controller 200 and phase drivers 201, 202, but the ON counter address can be different than the OFF counter address. Accordingly, the addresses of the ON and OFF counters are free to differ at any point in time. When a given phase address A0–A3 matches an output of a corresponding phase driver ON counter, the next instance of an ON signal from data bus 203 turns on that particular phase. The same control scenario applies for determining the OFF signal operation.

The pulses from data lines D0 and D1 provide a trigger for turning a phase ON or OFF, respectively. The pulses on data lines D0 and D1 also serve to increment the ON and OFF counters so that the address for the next phase to be switched is provided apriori. Accordingly, the ON and OFF phase counters are constantly being incremented at every pulse of both D0 and D1, and are ready to provide the next switching event address for almost an entire period prior to the next pulse on data lines D0 or D1.

Figure 3:
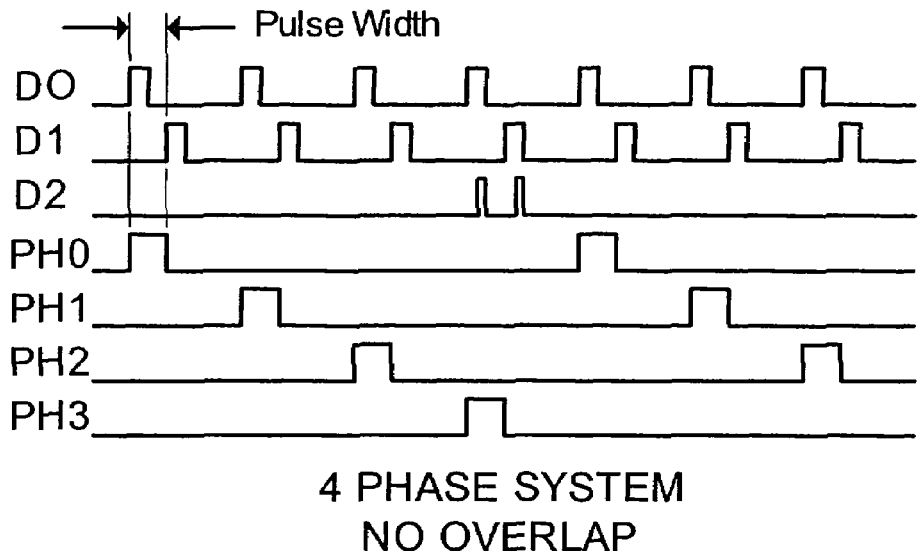
FIG. 3 is a timing diagram showing data and phase signals with no phase overlap.

Referring for a moment to FIG. 3, a timing diagram with a three wire system and four phases is illustrated where there is no phase overlap between phases PH0–PH3. In this instance, only one phase is turned on at any time during steady state operation. Accordingly, the ON and OFF addresses for each of the phase drivers is the same before the particular phase turns on. The pulse width of the phases is determined by the timing difference between data bus lines D0 and D1. Logic is provided that resets the counters to 0 by producing a narrow pulse at the end of either the D0 or D1 signal. After these narrow pulses, the next instance of a D0 or D1 pulse turns ON or OFF phase PH0 accordingly.

Figure 4:
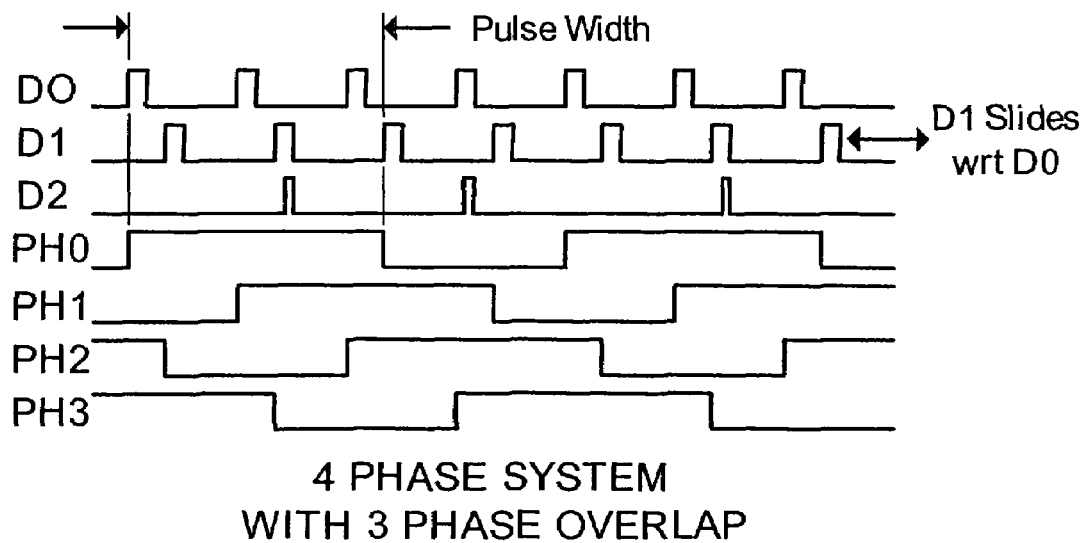
FIG. 4 is a timing diagram showing data and phase signals with 3 phase overlap.

Referring for a moment to FIG. 4, a three wire system with four phases is illustrated in a timing diagram with three phase overlap. In this instance, the ON and OFF addresses in each of phase drivers 201, 202 will be different. In general, the ON and OFF addresses rotate with respect to each other in an infinitely variable manner. Data lines D0 and D1 provide timing for turning ON and OFF phases in the phase drivers, respectively. In the case in FIG. 4, the address of the OFF counter lags behind the address of the ON counter by two periods. As the input voltage changes, the duty cycle also changes and data line D1 slides with respect to the fixed position of data line D0, which is provided from the oscillator in controller 200. The control configuration may be more easily understood from the perspective that each pulse on data line D0 and D1 represents a numbered address. For a buck converter, as the input voltage rises, the duty cycle is reduced, and data line D1 will move to the left. Conversely, D1 will move to the right as the input voltage is lowered.

Figure 5:
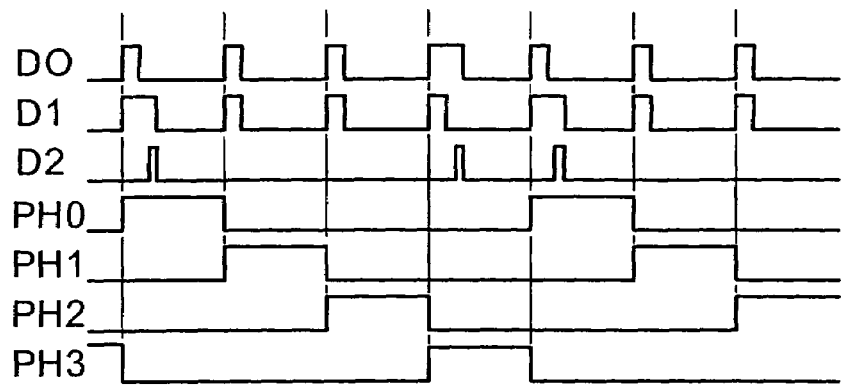
FIG. 5 is a timing diagram showing data and phase signals with simultaneous ON/OFF switching.

Data line signals D0 and D1 may be coincident, as illustrated in FIG. 5. FIG. 5 represents a four-phase system with a 25% duty cycle. Since the rising edges of data line D0 and D1 are coincident, the ON and OFF functions can be implemented simultaneously.

Figure 6:
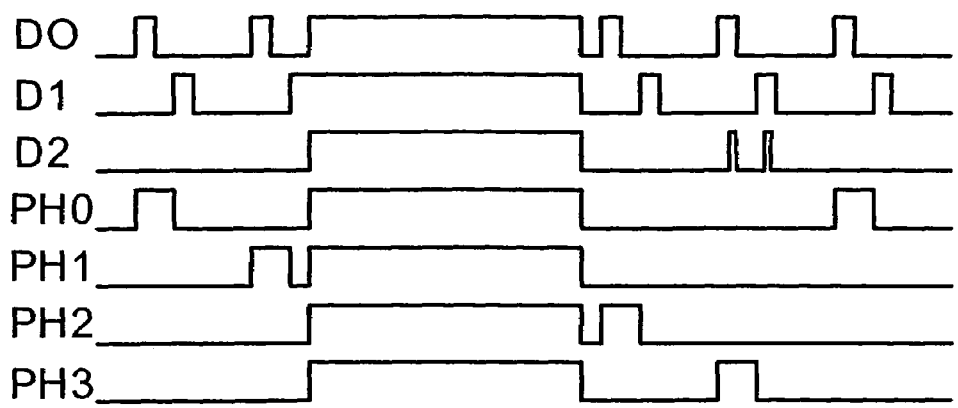
Figure 7:
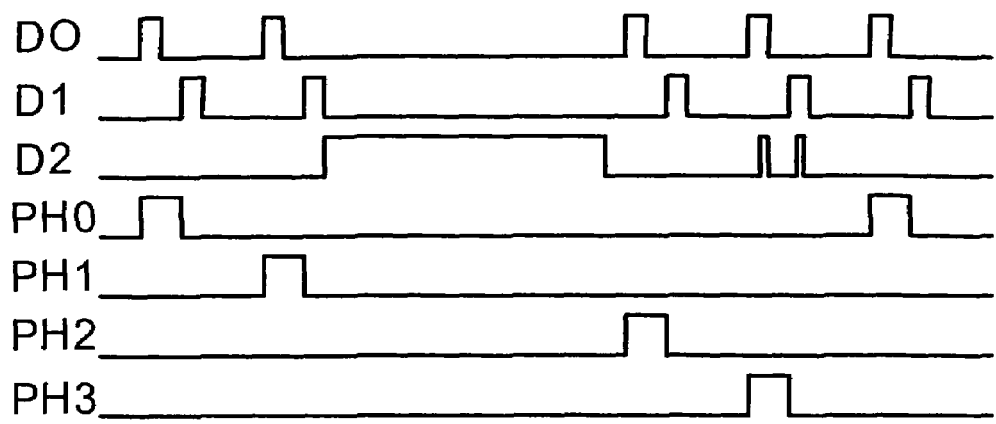
FIG. 7 is a timing diagram showing data and phase signals with all phases OFF.
Figure 8:
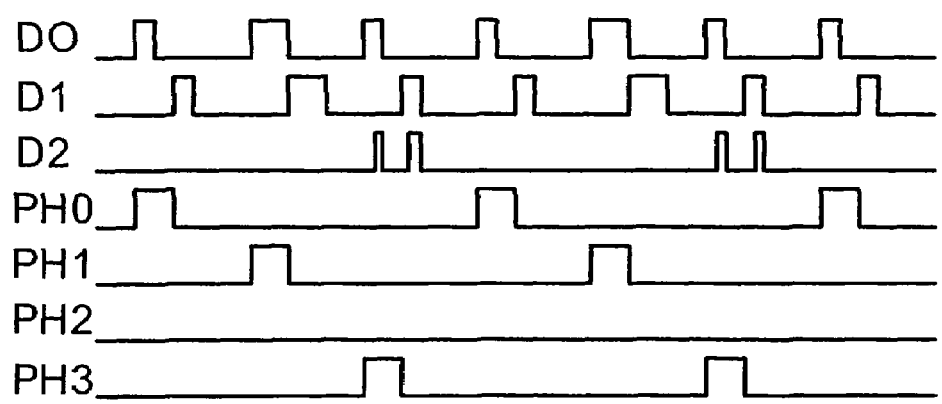
FIG. 8 is a timing diagram showing data and phase signals with a phase skipped.

Referring now to FIGS. 6–8, FIG. 6 illustrates the case where all phases are turned ON by providing data line signals D0–D2 as high logic signals. In FIG. 7, all phases are turned OFF by providing data lines D0 and D1 as logic lows, while data line D2 is held high, corresponding to the entries in Table 50 shown in FIG. 2. In each case, when the logic states are removed, the phases resume their normal rotation. The resumption of normal rotation may be accomplished by appropriate logic in the driver ICs that bypasses the counters and goes directly to the output driver.

Referring to FIG. 8, the case of skipping a phase is illustrated. In this instance, data lines D0 and D1 pulses are wider than normal and the phase drivers have steering logic to sense the wider pulses and increment the ON and OFF counters twice instead of just once. Skipping the phases is desirable if an overtemperature or other fault condition occurs in the phase. Since data line signal D0 does not change its period, phase skipping effectively increases the switching frequency of the remaining phases.

Referring again to FIG. 1, controller 200 and phase drivers 201, 202 include steering logic to perform a variety of other functions, including resetting the ON/OFF counters when a control cycle is finished and it is time to return to the first phase. In addition, the steering logic can force all phases on or all phases off during transient conditions to improve responsiveness and noise immunity. Forcing all phases either ON or OFF is accomplished with the signals on data line D2, as shown in Table 50 of FIG. 2.

Each of the phases 201, 202 can provide a current sharing configuration in accordance with a number of scenarios. As shown in FIG. 1, phase drivers 201, 202 preferably use a common current sharing bus ISHR provided to controller 200. The current sharing feedback signal operates by indicating the next phase to be turned off when the ISHARE switch 201A, 202A in the respective phase driver 201, 202 is turned on. The ISHR signal represents the difference between the average current of the next phase to be turned off and the average of all phase currents. Controller 200 can appropriately alter the operation of PWM 205, such as by modifying the ramp used to generate the PWM output, to provide current sharing control.

Referring now to FIG. 2, a truth table for a three wire data bus as illustrated in FIG. 1 is shown as Table 50. When data lines D0–D2 are all zero, for example, there is no change in phase drivers 201, 202. Where signals D0–D2 are active, the system can use logic levels as either leading edge or falling edge pulses, using either positive or negative logic.

When signal D0 provides a pulse, the phase whose address matches its ON counter will turn on. Similarly, when data line D1 provides a pulse, the phase whose address matches is OFF counter will turn off. It should be apparent that lines D0 and D1 act independently so that it is permissible to turn one phase on and a different phase off simultaneously as shown by the instance of the entry 011 state in Table 50. The independence of the data signals is important for stable waveforms and to avoid delays that might otherwise cause output voltage ripple to fall outside of a desired range.

As with the data signals, the ON/OFF counters can use rising and falling edges of the data bus signals for instructions from controller 200. For example, if the signals on bus 203 are short pulses, the first pulse edge of D0 can turn on the particular phase, while the second pulse edge of D0 increments the ON counter address, thereby preparing all the ON counters in the phase drivers for selection of the next phase. The OFF counter can be controlled in a similar scenario. A number of signaling techniques may be used, including rising or falling clock edges, short pulses, wide pulses, a number of pulses, and so forth, any of which may be used to control phases 0–N.

In a modulo-N system, the ON and OFF counters in controller 200 and in each phase driver 201, 202 are reset to obtain modulo-N counters on a flexible basis. The 101 and 110 states illustrated in Table 50 indicate a reset for the ON and OFF counters, respectively, for controller 200 and all phase drivers 201, 202. That is, all ON counters are reset by state 101, while all OFF counters are reset by state 110. The reset signals are timed by steering logic in controller 200 based on the N programmable inputs in block 209. The 100 and 111 states in Table 50 turn all phases OFF or ON, respectively. These two signals avoid delays to phase drivers 201, 202 in transient conditions in a multi-phase system to ensure an extremely fast response. Other instructions illustrated in Table 50 provide phase skipping conditions, such as when data lines D0 or D1 are provided with wide pulses.

In the three wire system illustrated in FIG. 1, only one PWM 205 is needed to control multiple phases rather than a multiple set of PWM components. Each phase is controlled by the same PWM 205 so there is no offset or drift errors to cause imbalance among the various phases. A single compensation network among the various phases reduces part counts as well. For example, no particular communication protocol or hardware is needed to communicate among the various phases. The digital bus system provided in accordance with the present invention improves the system responsiveness to phase jitter because of the higher signal to noise ratio of digital vs. analog control. In addition, precision timing resistors that would ordinarily be used for phase control are avoided, thereby reducing part count and system complexity as well as cost.

Controller 200 can quickly modify the operation of the various phases through digital bus 203 so that the system according to the present invention can obtain an optimized response to transient conditions. For example, there is no need to wait for a clock oscillator to command each phase separately in its turn, as might be the case in individually addressed phase drivers. It has also been found that turning all phases on or off simultaneously optimizes recovery from a transient condition.

Controller 200 can be programmed to skip phases that have experienced over temperature or phase driver failure and can expand system functionality without having to place the system in a fail safe or a "flat tire mode" where one phase is not working. The use of the phase skipping control may utilize additional sense signals that are provided to controller 200 to obtain the additional system functionality.

Advantageously, independent and simultaneous control of phases 0–N is possible through the use of dedicated signal lines for ON and OFF signals. A number of additional instructions can be generated in a variety of ways, including varying the pulse width of the data bus signals on bus 203, increasing the number of pulses, such as may be the case in a burst mode, using rising or falling clock edges, short pulses, wide pulses, varying the number of pulses, and so forth with the appropriate decoding logic accompanying the phase drivers 201, 202. According to the present invention, a universal control IC may be developed that operates with standard controller ICs that are configured with an oscillator and a PWM component. The present invention may be used in both voltage and current mode control schemes with the appropriate control ICs as well.

FIGS. 5–8 illustrate various differing control schemes according to timing diagrams of data lines and phase line, respectively. The control of the phases correspond to the signals on the data lines D0–D2. Through the use of digital bus 203 and the signals on data lines D0–D2, a simultaneous ON/OFF configuration may be realized, as illustrated in FIG. 5, an all ON configuration may be realized as shown in FIG. 6, an all OFF configuration may be realized as shown in FIG. 7, or a phase skipping configuration may be realized as shown in FIG. 8.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A multi-phase power control system, comprising:
   a controller for controlling a plurality of phase drivers that control an output voltage of the multi-phase power control system and having control logic to generate data signals for application to each of the plurality of phase drivers;
   each phase driver providing a switching signal to control power flow in the power control system, the data signals being applied to the phase driver, and wherein each phase driver has a unique address;

control logic in each phase driver for selection of the phase driver to act on data signals applied to the phase driver from the controller, wherein the control logic in each phase driver selects the phase driver to act on the data signals based on the unique address of the phase driver and by performing a counting operation on the data signals from the controller.

2. The power controller according to claim 1, wherein the control logic in the controller includes a counter and an output supplying at least one of the data signals.

3. The power controller according to claim 1, wherein the control logic in each phase driver includes a counter for contributing to selecting the phase driver.

4. The power controller according to claim 1, further comprising a PWM component in the controller.

5. The power controller according to claim 4, further comprising a current sharing signal supplied from each phase driver to the PWM component to contribute to adjusting current sharing among the plurality of phase drivers.

6. A method of controlling a multi-phase power supply, comprising:
   generating a data signal in a controller related to switching a phase of the power supply;
   applying the data signal to a phase driver to permit the phase driver to switch a phase in accordance with the data signal when selected; and
   controlling the phase driver to be selected according to a particular addressing configuration, whereby the phase driver is operable to switch the phase when selected based on a counting operation performed on the applied data signal and on the particular addressing configuration.

7. The method according to claim 6, further comprising counting pulses in the controller to determine values for the data signals.

8. The method according to claim 6, further comprising counting events in the phase driver to provide a scheduled selection of the phase driver for receiving and acting on the data signal from the controller.

9. The method according to claim 6, further comprising:
   supplying a current sharing feedback signal from the phase driver to the controller; and
   modifying the data signals by altering the timing to permit the phase driver to supply current in accordance with a current sharing configuration.

10. The method according to claim 9, wherein modifying the data signals comprises altering the timing of the data signals.

11. A multi-phase power supply control, comprising:
   a phase driver for switching a phase of a multi-phase power supply, wherein the phase driver has a unique address;
   a set of logic components in the phase driver for selecting the phase driver and reacting to control input supplied to the phase driver, wherein the set of logic components selects the phase driver based on the unique address of the phase driver and by performing a counting operation on the control input;
   a data bus coupled to the phase driver for supplying the control input to the phase driver;
   a controller coupled to the data bus for supplying the control input applied to the phase driver through the data bus; and
   control logic in the controller for monitoring periodic events and generating the control input to the data bus based on a predetermined control configuration, whereby the phase driver realizes the predetermined control configuration when selected.

* * * * *